United States Patent [19]

Freitag et al.

[11] Patent Number: 4,651,979
[45] Date of Patent: Mar. 24, 1987

[54] TEMPERATURE-COMPENSATED GAS SPRING

[75] Inventors: Herbert Freitag, Koblenz; Castor Fuhrmann, Brachtendorf; Bernd Körtgen, Adenau, all of Fed. Rep. of Germany

[73] Assignee: Stabilus GmbH, Koblenz-Neuendorf, Fed. Rep. of Germany

[21] Appl. No.: 772,654

[22] Filed: Sep. 4, 1985

[30] Foreign Application Priority Data

Sep. 5, 1984 [DE] Fed. Rep. of Germany ....... 3432604

[51] Int. Cl.⁴ ............................ F16F 9/02; F16F 9/52; E05F 3/00
[52] U.S. Cl. .................................. 267/64.13; 188/276; 188/281
[58] Field of Search ................. 188/276, 281, 300; 16/66; 267/120, 124, 126, 64.11, 64.13, 64.15; 296/56, 57 A; 280/708

[56] References Cited

U.S. PATENT DOCUMENTS

| 3,963,227 | 6/1976 | Mölders | 267/120 |
| 4,466,514 | 8/1984 | Mölders et al. | 188/320 |
| 4,529,180 | 7/1985 | Hill | 188/276 X |

FOREIGN PATENT DOCUMENTS

| 1455180 | 3/1969 | Fed. Rep. of Germany ... 267/64.15 |
| 3324214 | 3/1984 | Fed. Rep. of Germany . |

Primary Examiner—Andres Kashnikow
Assistant Examiner—Robert J. Oberleitner
Attorney, Agent, or Firm—Brumbaugh, Graves, Donohue & Raymond

[57] ABSTRACT

For a temperature-compensated gas spring, which consists of a container in which a concentrically arranged cylinder is arranged, where a main pressure chamber is separated in sealing manner from an auxiliary pressure chamber by a piston which is connected with a piston rod, a damping arrangement is provided for controlling the outward thrust speed. This is effected in that a damping chamber is arranged in which a damping piston provided with damping valves slides, the damping piston being arranged on an auxiliary piston rod which is in axially fixed connection with the piston rod.

15 Claims, 2 Drawing Figures

TEMPERATURE-COMPENSATED GAS SPRING

BACKGROUND OF THE INVENTION

The invention relates to a temperature-compensated gas spring.

STATEMENT OF THE PRIOR ART

A temperature-compensated gas spring is known from Fed. German Publ. Spec. No. 3,324,214. In that case the piston forms the separating element between the main pressure chamber and the auxiliary pressure chamber, and no constriction must be present between these two chambers, in order to guarantee the effectiveness of the temperature-compensated gas spring. In this construction it is disadvantageous that it comprises no possibility of any kind of controlling the speed of inward and outward thrust of the piston rod.

OBJECT OF THE INVENTION

It is the object of the present invention to produce a temperature-compensated gas spring which possesses a damping arrangement dependent upon the movement of the piston rod and if necessary renders possible a hydraulic end position damping when the piston rod is in the nearly outermost position.

SUMMARY OF THE INVENTION

A temperature-compensated gas spring comprises a container with a cylinder arranged concentrically therein. A piston connected with a piston rod is axially movable within the cylinder and separates a main pressure chamber in a sealing manner from an auxiliary pressure chamber. The main pressure chamber consists of a partial chamber within the cylinder and a partial chamber situated between the cylinder and the container. A gas filling under pressure is provided within the main pressure chamber and exerts a greater force upon the piston rod than a gas pressure prevailing in the auxiliary pressure chamber, which is preferably formed by a two-phase system in which the liquid phase and the vapour phase are in equilibrium. The pressure variation in the main pressure chamber and that in the auxiliary pressure chamber, due to the temperature variation, are so adapted to one another that no variation, or at least no appreciable variation, of the resultant force exerted upon the piston rod takes place. A damping chamber is provided in which there slides a damping piston provided with damping valves, the damping piston being arranged on an auxiliary piston rod which is in axially fixed connection with the piston rod. By the arrangement of an additional damping chamber it is readily possible also to arrange a small quantity of liquid therein so that a hydraulic end position damping is rendered possible in such a gas spring construction. The damping piston itself, as known in gas spring pistons, can comprise a damping valve acting in dependence upon direction of movement, which is preferably formed by a piston ring axially movable in a piston groove, which ring clears a larger damping cross-section in the inward movement of the piston rod than in the outward thrust of the piston rod. Thus in a simple manner it is made possible to fix above all the outward thrust speed of the piston rod at a pre-determined value, while the inward thrust movement can take place with no or almost no damping.

In further development of the invention the damping chamber is formed by a damping cylinder which is subject to the pressure of the main pressure chamber and is sealed off from the main pressure partial chamber of the cylinder. According to one feature here the seal arranged between the damping chamber and the main pressure chamber of the cylinder is formed as piston rod seal for the auxiliary piston rod. In this way a secure sealing is achieved between the main pressure partial chamber of the cylinder and the partial damping chamber surrounding the auxiliary piston rod.

A very simple and satisfactorily fittable assembly is achieved according to one feature of the invention in that between the cylinder and the damping cylinder there is arranged a connection part which is centred on the inner wall of the container and connects the main pressure partial chamber of the cylinder by means of at least one passage opening with the main pressure partial chamber defined by the container. According of one feature the connection part is formed by a ring provided with a longitudinal slot and having a central annular extension adapted to the internal diameter of the container, while a cylindrical section is provided for the fixing of the damping cylinder. In a simple manner the passage of opening between the main pressure partial chamber of the cylinder and the main pressure partial chamber defined by the container is formed by the longitudinal slot.

For differing damping effect dependent upon the direction of movement of the piston rod, the damping piston is provided with a valve arrangement which clears different throttle cross-sections controlled in dependence upon the direction of movement of the piston rod. In order to achieve a hydraulic end position damping, a specific quantity of liquid is provided in the damping chamber, and it is advantageous if in accordance with the invention a partition is provided which separates the gas chamber, subject to the pressure in the main pressure chamber, from the damping chamber which comprises a liquid filling or partial liquid filling. In accordance with the invention this partition can be formed by a separator piston situated in the damping cylinder, or it is formed by a micro-porous sintered part which acts as oil barrier.

In accordance with a further feature of the invention the auxiliary piston rod is connected axially fixedly but articulatedly with the piston rod. Thus it is rendered possible for the components to be manufactured with relatively coarse tolerances without the occurrence of increased friction due to stressing of piston and damping piston. The articulated connection of the auxiliary piston rod with the piston rod also permits of the auxiliary piston rod being secured with the piston rod, according to one feature, by a screw connection. In this case according to one feature in accordance with the invention the auxiliary piston rod can comprise an extension serving for the reception of the piston, the piston being fastened in the connection of the auxiliary piston rod with the piston rod. Such a form of embodiment permits a very simple assembly of the piston which consists according to the invention of two piston discs between which the piston seal is arranged. Ths piston seal can be limited according to one feature on both sides in the axial direction by a slide ring arranged in a recess of the piston disc.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be explained in greater detail below by reference to the examples of embodiment represented in the drawings, wherein.

DESCRIPTION OF THE PREFERRED EMBODIMENT

Figure 1:
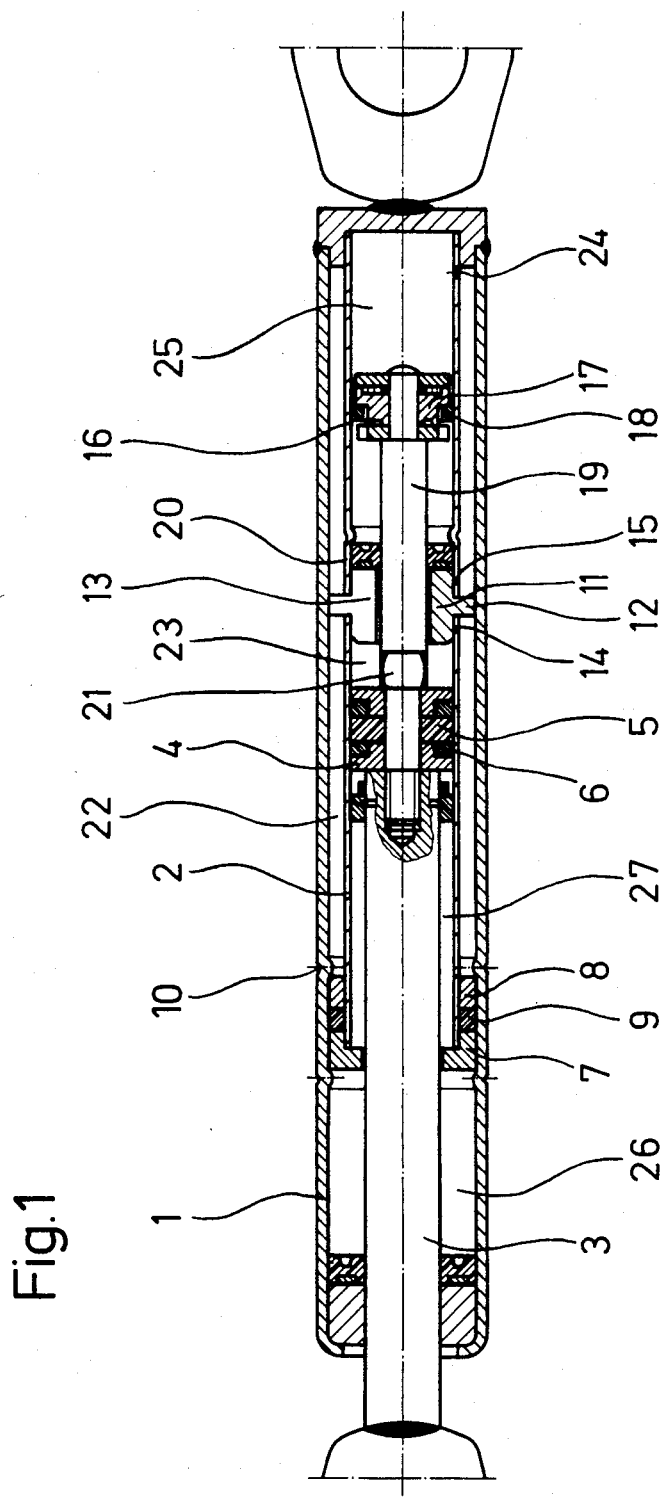
FIG. 1 shows a temperature-compensated gas spring provided with a damping arrangement, in longitudinal section.

The temperature-compensated gas spring as shown in FIG. 1 comprises a container 1 in which a cylinder 2 is concentrically arranged. At the one end of the container there are a guide and a seal for a piston rod 3 which is connected with a piston 4 consisting of two piston discs which limit a piston seal 5. The piston discs of the piston 4 are provided with recesses in which there are arranged slide rings 6 abutting axially on the piston seal. In the container 1 the cylnder 2 is centred by a securing ring 7, provided with an extension, and by a further securing ring 8, and sealed by means of a cylinder seal 9. This centring unit, consisting of the securing rings 7 and 8 and the cylinder seal 9 clamped in between them, is clamped in by corrugations 10 arranged in the container 1. At the other end of the cylinder 2 there is a connection part 11 which is centred with an annular extension 12 on the inner wall of the container 1. This connection part 11 has a longitudinal slot 13 forming a passage opening, while a cylindrical section 14 serves for the fixing of the cylinder 2 and a further cylindrical section 15 serves as reception part for a damping cylinder 16. A damping piston 17 connected with an auxiliary piston rod 19 slides on the inner wall of the damping cylinder 16. This damping piston 17 is formed as labyrinth piston, and the labyrinth forms a constantly opened passage cross-section, while a damping valve 18 is formed by a piston ring which is axially movable in a piston groove and clears a further crosssection in the pushing in of the damping piston 17, while in the outward movement this cross-section is closed by the piston ring. The interior of the damping cylinder, which surrounds the auxiliary piston rod 19, is separated and sealed from a main pressure partial chamber 23 inside the cylinder, by a piston rod seal 20. A screw connection is provided for the connection of the auxiliary piston rod 19 with the piston rod 3, and an extension of the auxiliary piston rod 19 serves at the same time for the fastening of the piston 4. In order to avoid stressing due to faulty alignment between the piston 4 and the damping piston 17, an articulation 21 is provided which pemits a radial movement of the auxiliary piston rod 19 and thus of the damping piston 17. A main pressure chamber 22 comprises a gas filling under pressure and consists of an annular chamber existing between the container 1, the cylinder 2 and the damping cylinder 16, also a main pressure partial chamber 23 internal to the cylinder and a damping chamber 25. The main pressure partial chamber 23 within the cylinder comprises a passage opening to the main pressure chamber 22, formed by the longitudinal slot 13 in the connection part 11, while the damping chamber 25 is in communication through one or more passage openings 24 with the main pressure chamber 22. An auxiliary pressure chamber 26 is in communication through an annular passage cross-section, formed by the securing ring 7 and the piston rod 3, with an axliary pressure partial chamber 27 of the cylinder, and is sealed off from the main pressure chamber 22 by means of the cylinder seal 9 and the piston seal 5. This auxiliary pressure chamber 26 is preferably filled with a two-phase system, that is with a liquid gas in which the liquid phase and the vapour phase are in equilibrium.

Due to the gas pressure prevailing in the main pressure chamber 22 and thus also in the main pressure chamber 23 within the cylinder and in the damping chamber 25 a force is exerted upon the piston rod 3, corresponding to the product of the pressure and the area of the piston 4. By the pressure in the auxiliary pressure chamber 26 and thus in the auxiliary pressure partial chamber 27 of the cylinder a counter-force is exerted which corresponds to the piston area, less the piston rod cross-sectional area, multiplied by the pressure in the auxiliary pressure chamber 26. The damping piston 17 provided with the damping valve 18 serves for the damping of the outward thrust movement. In order to achieve a hydraulic end position damping it is readily possible for a certain quantity of liquid to be provided in the partial chamber surrounding the auxiliary piston rod 19, which quantity, by reason of an appropriate position of installation of the temperature-compensated gas spring, effects a liquid damping when the piston rod 3 is in the nearly outermost position.

Figure 2:
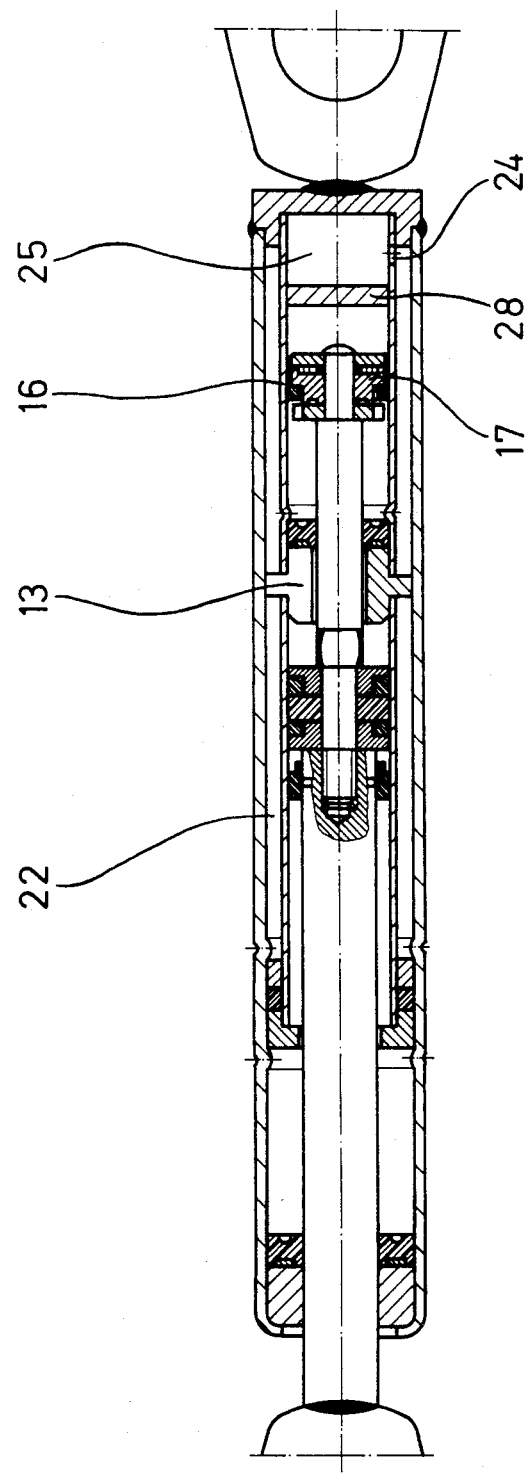
FIG. 2 shows the temperature-compensated gas spring according to FIG. 1, with a partition arranged in the damping cylinder.

The form of embodiment according to FIG. 2 differs from that according to FIG. 1 essentially in that a partition 28 is provided in the interior of the damping cylinder 16. This partition 28 can be formed for example by a separator piston movable axially in the damping cylinder 16, or can consist of a fixed partition which is formed by a microporous sintered part acting as oil barrier, but letting the gas through almost without hindrance. In this way, irrespective of the position of installation of the temperature-compensated gas spring, the quantity of liquid situated in the damping chamber can be held without danger of liquid flowing away into the main pressure chamber 22 through the passage opening 24.

So that a constant or nearly constant outward thrust force of the piston rod is maintained in such temperaturecompensated gas springs in a temperature range from about $-30°$ C. to $+80°$ C., an appropriate attunement of the compressed gas filling in the main pressure chamber 22 and of the gas pressure in the auxiliary pressure chamber 26 is necessary. Likewise the dimensioning of the areas upon which the gas pressure acts is of importance. Nitrogen gas is a suitable filling medium for the main pressure chamber 22, while the auxiliary pressure chamber 26 is filled for example with Freon 12 ($CF_2CL_2$) as two-phase system.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. Temperature-compensated gas spring, comprising a container with a cylinder arranged concentrically therein in which a piston connected with a piston rod is axially movably arranged and separates a main pressure chamber in sealing manner from an auxiliary pressure chamber, where the main pressure chamber consists of a partial chamber within the cylinder and a partial chamber situated between cylinder and container and comprises a gas filling under pressure which exerts a greater force upon the piston rod than the gas pressure prevailing in the auxiliary pressure chamber, which is preferably formed by a two-phase system in which the liquid phase and the vapour phase are in equilibrium, while the pressure variation in the main pressure chamber and that in the auxiliary pressure chamber, due to temperature variation, are so adapted to one another that substantially no variation of the resultant force exerted upon the piston rod takes place, a damping chamber (25) being provided in which there slides a damping piston (17) provided with damping valve (18), the damping piston (17) being arranged on an auxiliary piston rod (19) which is in axially fixed connection with the piston rod (3).

2. Temperature-compensated gas spring according to claim 1, characterised in that the damping chamber (25) is formed by a damping cylinder (16) which is subject to the action of the pressure of the main pressure chamber (22) and is sealed off from the adjoining main pressure partial chamber (23) within the cylinder.

3. Temperature-compensated gas spring according to claim 2, characterised in that the seal arranged between the damping chamber (25) and the main pressure chamber (23) of the cylinder is formed as piston rod seal (20) for the auxiliary piston rod (19).

4. Temperature-compensated gas spring according to claim 1, characterised in that between the cylinder (2) and the damping cylinder (16) there is arranged a connection part (11) which is centred on the inner wall of the container (1) and connects the main pressure partial chamber (23) within the cylinder with the main pressure chamber (22) by means of a passage opening.

5. Temperature-compensated gas spring according to claim 4, characterised in that the connection part (11) is formed by a ring provided with a longitudinal slot (13) and having a central annular extension (12) adapted to the internal diameter of the container (1), while a cylindrical section (14) is provided for the fixing of the cylinder (2) and a second cylindrical section (15) is provided for the fixing of the damping cylinder (16).

6. Temperature-compensated gas spring according to claim 5, characterised in that the passage opening between the main pressure partial chamber (23) within the cylinder and the main pressure chamber (22) is formed by the longitudinal slot (13).

7. Temperature-compensated gas spring according to claim 1, characterised in that the damping piston (17) comprises a valve arrangement (18) which generates a damping effect differing in dependence upon the direction of movement of the piston rod (3).

8. Temperature-compensated gas spring according to claim 1, characterised in that in the damping cylinder (16) there is arranged a partition (28) which separates the gas chamber subject to the action of the pressure in the main pressure chamber (22) from the damping chamber (25) which is at least partially filled with a liquid.

9. Temperature-compensated gas spring according to claim 8, characterised in that the partition (28) arranged in the damping cylinder (16) is formed by a separator piston.

10. Temperature-compensated gas spring according to claim 8, characterised in that the partition (28) arranged in the damping cylinder (16) is formed by a microporous sintered part which acts as an oil barrier.

11. Temperature-compensated gas spring according to claim 1, characterised in that the auxiliary piston rod (19) is connected axially fixedly but articulatedly with the piston rod (3).

12. Temperature-compensated gas spring according to claim 11, characterised in that the auxiliary piston rod (19) is secured by a screw connection to the piston rod (3).

13. Temperature-compensated gas spring according to claim 11, characterised in that the auxiliary piston rod (19) comprises an extension which serves to receive the piston (4), the piston being secured in the connecting of the auxiliary piston rod (19) with the piston rod (3).

14. Temperature-compensated gas spring according to claim 1, characterised in that the piston (4) consists of two piston discs between which the piston seal (5) is arranged.

15. Temperature-compensated gas spring according to claim 1, characterised in that the piston seal (5) is limited on both sides in the axial direction by a slide ring (6) arranged in a recess of the piston disc.

* * * * *